United States Patent
Khatri et al.

(10) Patent No.: US 12,536,230 B2
(45) Date of Patent: Jan. 27, 2026

(54) SYSTEM AND A METHOD FOR DYNAMIC REGISTRATION OF PLUGINS IN AN ENTERPRISE PERFORMANCE MANAGEMENT SYSTEM

(71) Applicant: HONEYWELL INTERNATIONAL INC., Charlotte, NC (US)

(72) Inventors: Ambika Khatri, Bangalore (IN); Rod Stein, Edmonton (CA); Jitendra Singh, Bangalore (IN); Sakthi Vinayagan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/616,189

(22) Filed: Mar. 26, 2024

(65) Prior Publication Data

US 2025/0307315 A1 Oct. 2, 2025

(51) Int. Cl.
*G06F 16/901* (2019.01)

(52) U.S. Cl.
CPC ............... *G06F 16/901* (2019.01)

(58) Field of Classification Search
CPC .................................................. G06F 16/901
USPC ....................................................... 707/741
See application file for complete search history.

(56) References Cited

U.S. PATENT DOCUMENTS

| 6,119,130 | A | * | 9/2000 | Nguyen | G06F 16/213 |
| | | | | | 707/999.203 |
| 7,305,460 | B2 | * | 12/2007 | Park | G06F 8/65 |
| | | | | | 709/225 |
| 11,831,644 | B1 | * | 11/2023 | Thakore | G06F 16/2455 |
| 2004/0003390 | A1 | * | 1/2004 | Canter | G06F 8/61 |
| | | | | | 717/173 |
| 2007/0198586 | A1 | * | 8/2007 | Hardy | G06F 16/29 |
| 2010/0325085 | A1 | * | 12/2010 | Stritzel | G06F 9/44563 |
| | | | | | 707/812 |
| 2010/0325149 | A1 | * | 12/2010 | Etchegoyen | G06F 11/3409 |
| | | | | | 707/769 |

(Continued)

*Primary Examiner* — Kimberly L Wilson

(57) ABSTRACT

The present invention provides a system for dynamically registering plugin with an Enterprise Performance Management (EPM) system. The system provides a database module operationally coupled to a repository for storing information on registered enterprises, one or more user devices mapped to the registered enterprises, and a set of rules corresponding to each user device. The system further comprises a data identification module which is configured to receive data from one or more user devices and a converter framework comprising a converter module and a plugin module for conversion of data from a user device. The system further provides a registration module which is operationally coupled to said data identification module and the database module and is configured to receive a plugin registration request from a user device including a plugin, identify the user device and its data type, and determine if the plugin is already registered with the repository. Based on determining that the plugin is not already registered with the repository, update the repository to add the plugin and configuration information of said user device. Further, the system provides an access control module operationally coupled to database module to provide to the user device, an access to edit the configuration of added plugin.

18 Claims, 4 Drawing Sheets

(56) References Cited

U.S. PATENT DOCUMENTS

| | | | |
|---|---|---|---|
| 2011/0078293 A1* | 3/2011 | Phung | G06F 9/44505 709/222 |
| 2011/0113105 A1* | 5/2011 | Eckardt | G06Q 10/10 709/206 |
| 2012/0239754 A1* | 9/2012 | Vuong | H04W 4/50 709/206 |
| 2013/0151672 A1* | 6/2013 | Lee | H04L 65/61 709/219 |
| 2014/0325349 A1* | 10/2014 | Riherd | G06F 9/451 715/255 |
| 2015/0254026 A1* | 9/2015 | Kobayashi | H04N 1/00 358/1.13 |
| 2015/0347104 A1* | 12/2015 | Goossens | G06T 15/00 717/151 |
| 2016/0048400 A1* | 2/2016 | Yang | H04L 67/10 718/1 |
| 2017/0230487 A1* | 8/2017 | Cameron | H04L 67/125 |
| 2022/0004511 A1* | 1/2022 | Young | H04L 67/55 |
| 2023/0333794 A1* | 10/2023 | Yasuda | G06F 3/1205 |

\* cited by examiner

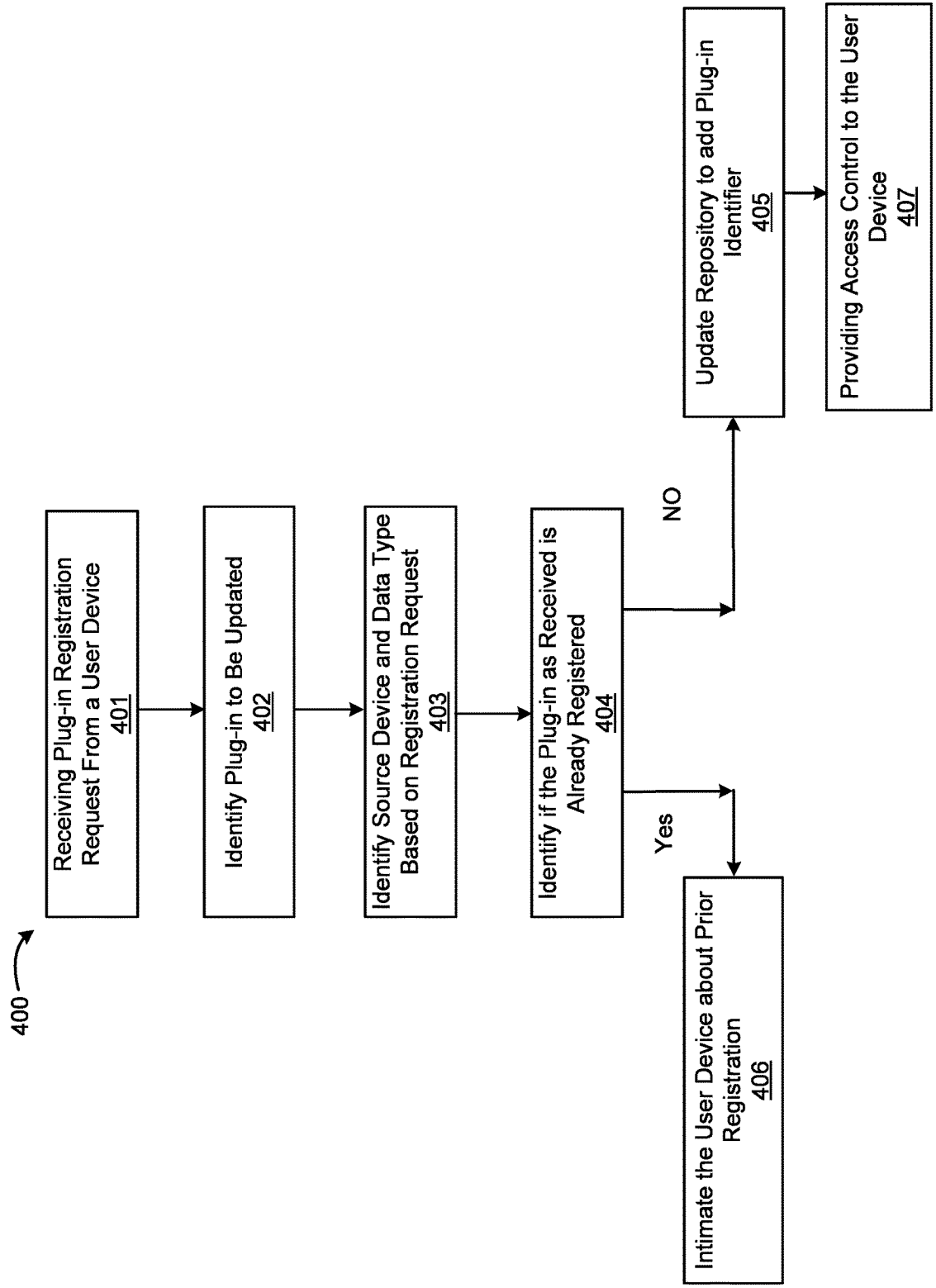

SYSTEM AND A METHOD FOR DYNAMIC REGISTRATION OF PLUGINS IN AN ENTERPRISE PERFORMANCE MANAGEMENT SYSTEM

TECHNICAL FIELD

Embodiments of the present disclosure generally relate to enterprise performance management systems. Particularly, the present disclosure provides a system and a method for dynamic registration of plugins for converting non-standard proprietary data into a standard format.

BACKGROUND

One of the benefits of an enterprise performance management (EPM) system is the consolidation of data from various enterprises or entities which are registered with the EPM system. The enterprise/entity implements the EPM system to obtain insights based on real-time data associated with the various devices connected to the system, so that it can equip various stakeholders to make efficient business decisions. The EPM system receives non-standard data which is sent over the network and converts it into a standardized format before the data is used for data analytics that can assist in any decision-making process for the business.

Generally, the EPM system includes a converter framework which has multiple converters for converting non-standard data into a standard format that is consumed by the EPM system. Further, the converter framework may also utilize one or more standard plugins for converting the data received from a user device. In general, a plugin is a software add-on which enables processing of specific types of content and integrating it into the platform. Plugins are utilized for converting incoming data from user devices into an intermediate format and subsequently, the intermediate format is converted by one or more converters in the converter framework for consumption by the EPM system.

In many instances, user devices associated with one or more enterprises may generate proprietary data which may need additional plugins for data conversion by converter framework of EPM system. A proprietary file format is a file format of an enterprise or individual that contains data stored with particular encoding-scheme and designed by the enterprise to be a secret, such that the decoding and interpretation of this stored data is accomplished only with particular software that the enterprise itself has developed. Proprietary formats are typically controlled by an enterprise for its own benefit thereby restricting others from using the data without prior permission/licenses.

In general, proprietary data would need additional plugins for data conversion by converter framework of EPM system. The user device which is generating the proprietary data often has necessary plugins for converting the proprietary data into an intermediate format, before the intermediate formatted data is converted to standard data by the converter of the EPM system. While the EPM system may consists of standards plugins based on different standard data type, however, the EPM system may lack additional plugins which are required for converting the proprietary data received from the user device.

The prior technologies fail to provide any mechanism for dynamically registering with the EPM system, proprietary plugins associated with specific user device so as to efficiency perform data conversion of proprietary data generated by the user devices.

Applicant has identified many technical challenges and difficulties associated with current solutions and through applied effort, ingenuity, and innovation, the applicant has provided a solution to the above mentioned drawbacks.

SUMMARY OF THE INVENTION

In general, embodiments of the present disclosure herein provide dynamic registration of plugins with the converter framework of the EPM system. Other implementations will be, or will become, apparent to one with skill in the art upon examination of the following figures and detailed description. It is intended that all such additional implementations be included within this description be within the scope of the disclosure and be protected within the scope of the following claims.

In one embodiment, the present invention provides a system for dynamically registering one or more plugins with an Enterprise Performance Management (EPM) system. The system provides a database module operationally coupled to a repository for storing information on registered enterprises, one or more user devices mapped to the registered enterprises, and a set of rules corresponding to each user device. The system further comprises a data identification module which is configured to receive data from one or more user devices and a converter framework comprising a converter module and a plugin module for conversion of data from a user device. The system further provides a registration module which is operationally coupled to said data identification module and the database module and is configured to receive a plugin registration request from a user device including a plugin, identify the user device and its data type, and determine if the plugin is already registered with the repository. Based on determining that the plugin is not already registered with the repository, the system updates the repository to add the plugin and configuration information of said user device. A plugin can be a module or component or a file. Further, the system provides an access control module operationally coupled to database module to provide to the user device, an access to edit the configuration of added plugin.

In another aspect, the present invention provides a method for dynamic registration of plugins in an enterprise management system, comprising receiving a registration request from one or more user devices for registering a plugin, identifying the user device and data type associated with requesting user device, determining if the plugin is already registered with the repository. Based on determining that the plugin is not already registered with the repository, the method further comprises updating the repository to add the plugin and configuration information of said user device. Further, the method includes providing the user device an access control for accessing/updating the configuration of added plugin.

In yet another aspect, the present invention provides a computer program product comprising at least one non-transitory computer-readable storage medium having computer-readable program code portions stored therein executed by a processor, the computer-readable medium when executed, is configured to receive a registration request from one or more user devices for registering a plugin, identify the user device and data type associated with requesting user device, and determine if the plugin is already registered with the repository. The program executed by the processor is further configured to update the repository to add the plugin and configuration information of said user device. Further, the program executed by the processor is further configured to provide the user device an access control for accessing/updating the configuration of added plugin.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
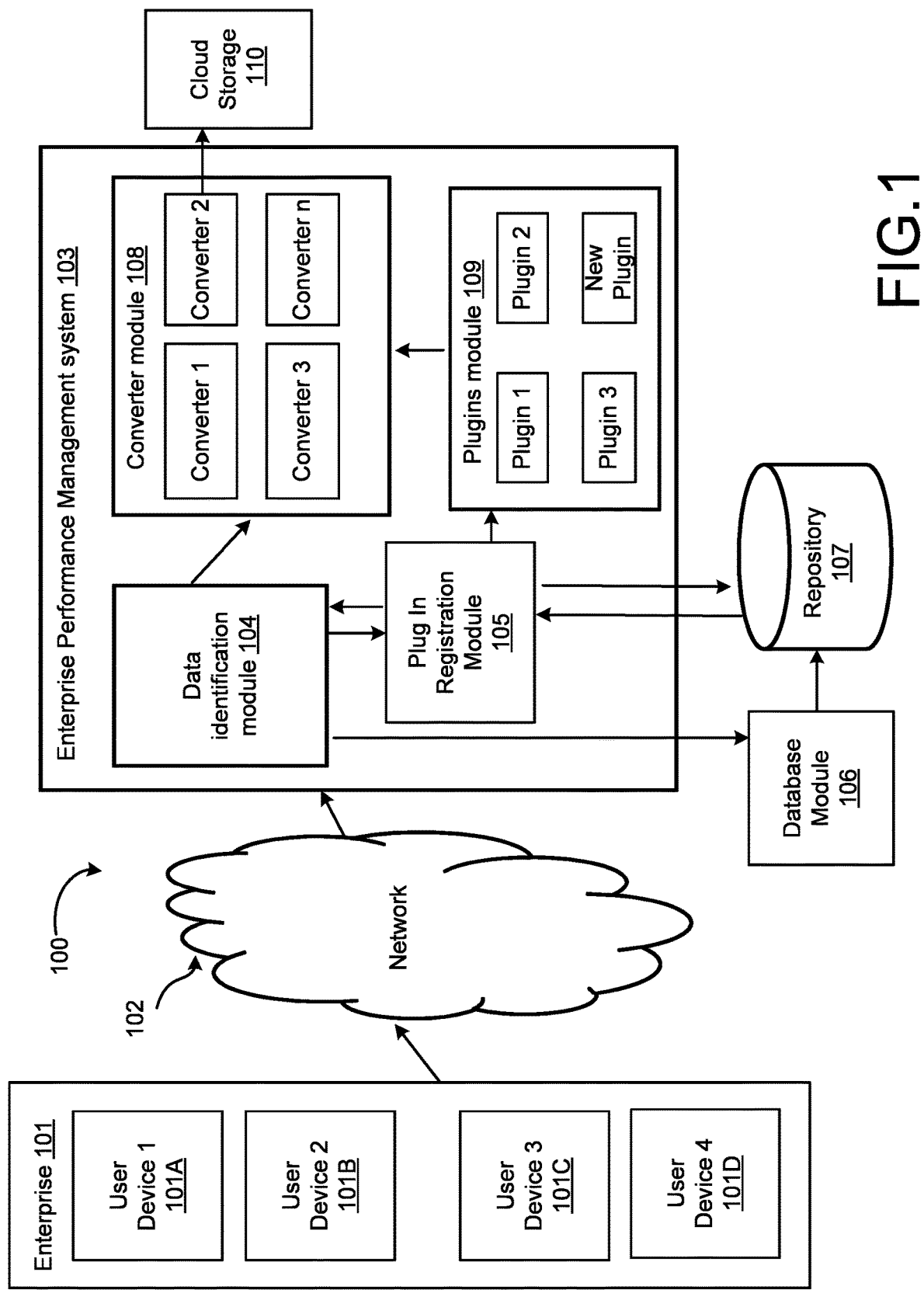
Figure 2:
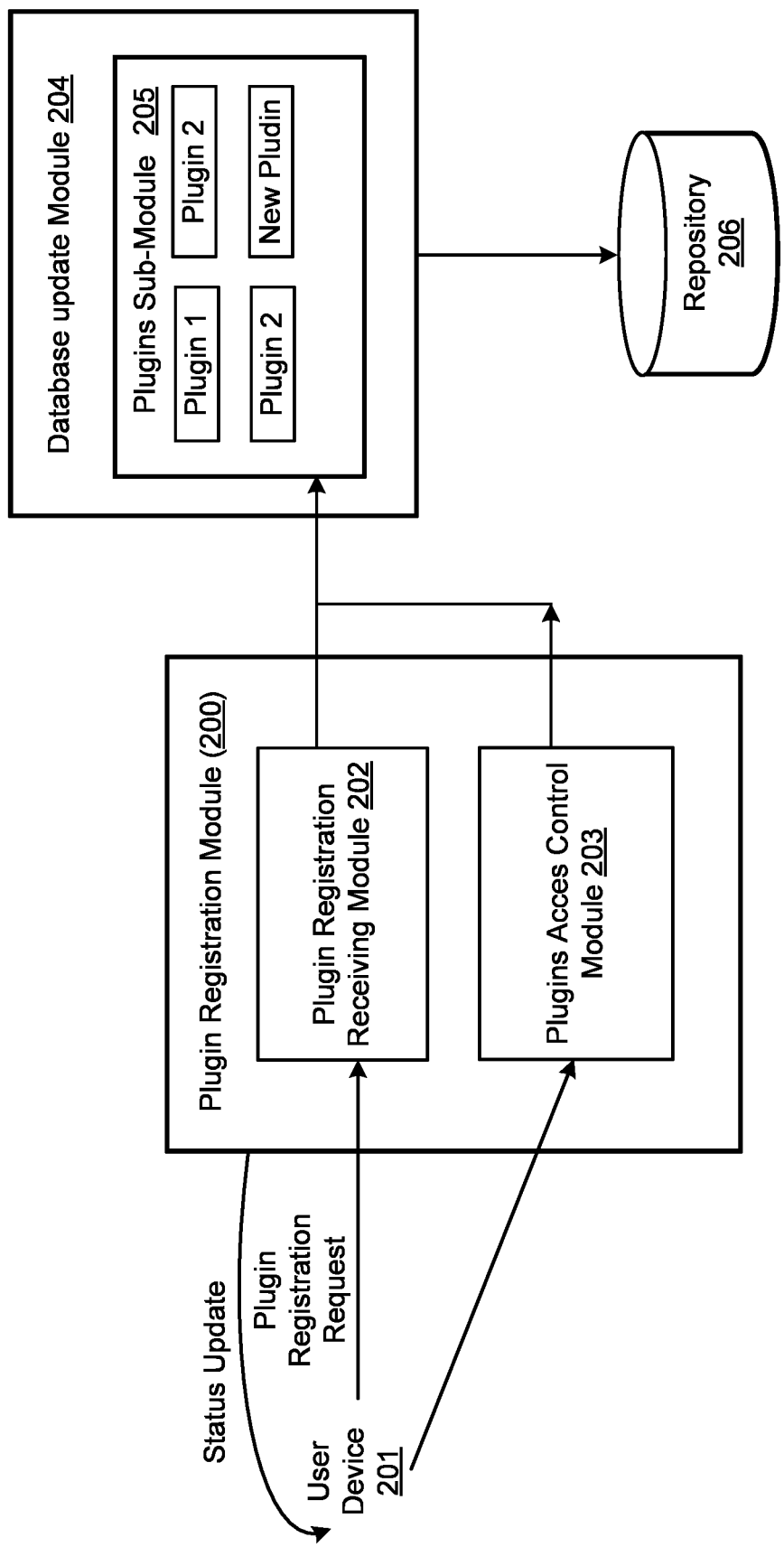
Figure 3:
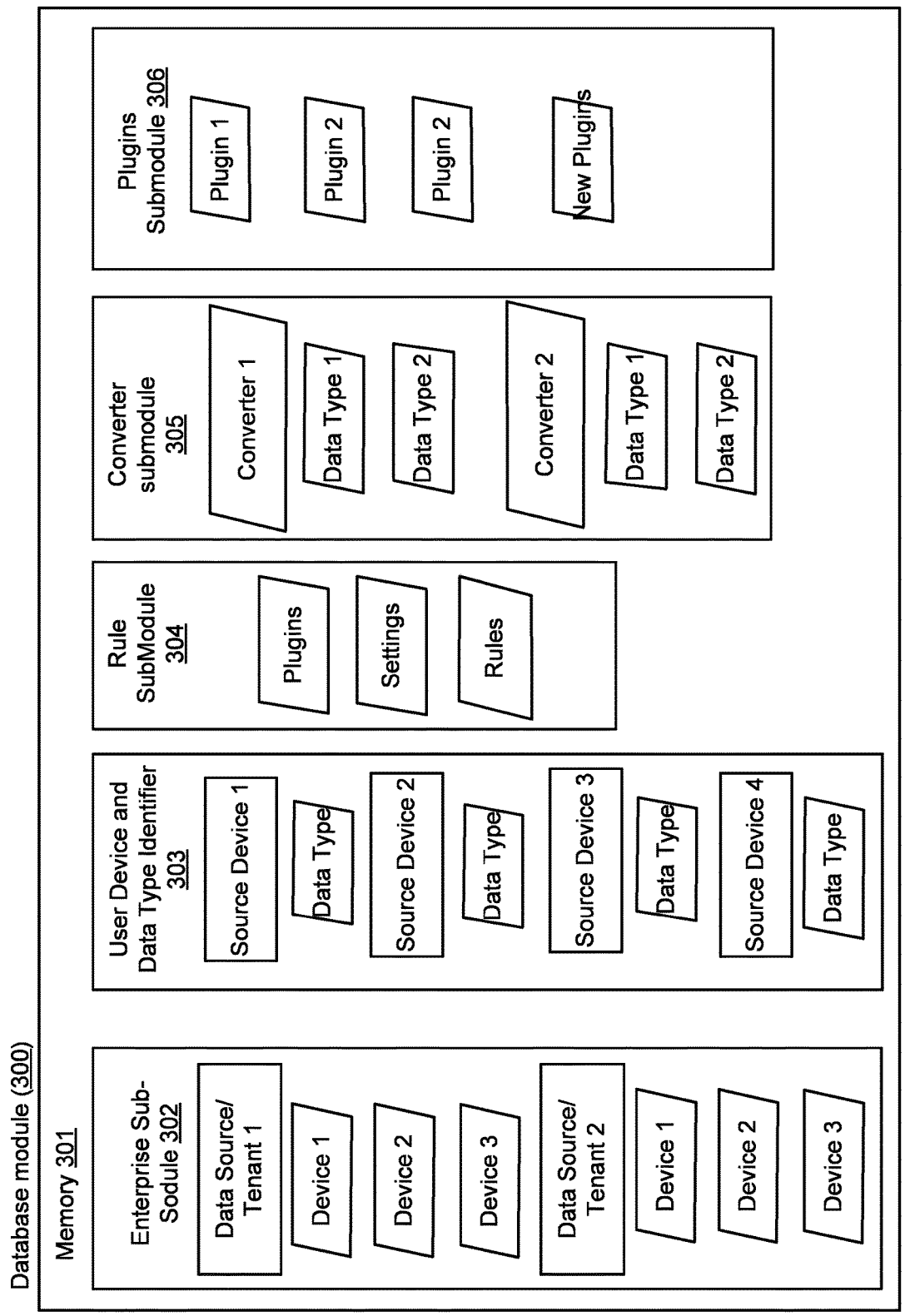

Having thus described the embodiments of the disclosure in general terms, reference now will be made to the accompanying drawings, which are not necessarily drawn to scale, and wherein:

FIG. 1 illustrates an exemplary block diagram of EPM framework in which embodiments of the present disclosure may operate;

FIG. 2 illustrates an exemplary block diagram of plugin registration module in accordance with an example embodiment of the present disclosure;

FIG. 3 illustrates an exemplary block diagram of a repository in accordance with an example embodiment of the present disclosure; and FIG. 4 is a flowchart depicting an example process for dynamically registering the plugins in accordance with the embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

An enterprise performance management (EPM) system integrates business processes, human resources and project management within an enterprise or across the value chain network of an enterprise. The EPM system plays an important role in managing various types of organizational data, from linking operational metrics to insights, and ultimately providing the organization with information that is used to formulate strategies, plans, and execution of applications and projects. With enterprise performance management systems, an organization can further drive improved performance across the organization by monitoring results against forecasts and goals and using analytics to recognize key trends and predict outcomes.

An enterprise performance management system requires initial registration of enterprises for which the EPM system will be implemented. During initial registration, one or more enterprises are registered with the EPM system and necessary configuration data is set up in the repository associated with the EPM system. This initial registration of enterprises comprises determining one or more user devices of the enterprises that will be configured to send data to the EPM system over the network. In an exemplary enterprise, one or more user device may be an IoT device, a server or an IoT gateway and may generate data in a non-standard format, which needs to be processed by the EPM system after necessary conversion by the converter framework.

Typically, the converter framework of the EPM system will include one or more converters and one or more standard plugins. However, an enterprise or user devices associated with enterprise may generate proprietary data which cannot be converted directly using converter framework of the EPM system. For converting the proprietary data, the EPM system will need to have necessary plugins which would help in converting the proprietary data into an intermediate format which is subsequently converted by the converter into a standard format, which can then be used by the EPM system for data analytics.

A particular challenge exists when the converter framework of the EPM system does not have necessary plugins that are required to convert proprietary data into an intermediate format. The Enterprise or the user device that generate proprietary data possess necessary plugins and will have to perform an additional step of converting the proprietary data into an intermediate format before the data is routed to the EPM system. However, this additional step puts undue burden on the enterprise domain systems as there could be many different plugins based on different proprietary data which an enterprise may generate.

Therefore, there is a need for an efficient system to centralize the plugins associated with user devices, wherein the EPM system is able to register the plugins in the converter framework so that the user device may simply route the data to the EPM system without the need for intermediate conversion by the user device.

Accordingly, the present disclosure provides a system and a method for dynamically registering the plugins in an EPM system, thereby making the EPM system more efficient and robust.

FIG. 1 illustrates an exemplary system 100 according to an aspect of the present disclosure. The system comprises one or more enterprises 101 having one or more user devices 101a, 101b which generate data to be used by EPM system 103. One or more enterprises 101 are connected to the EPM system 103 through a network 102.

In some embodiments, the network 102 may be a public network (e.g., the Internet), a private network (e.g., an internal localized, or closed-off network between particular devices). In some other embodiments, the network 102 may be a hybrid network (e.g., a network enabling internal communications between particular connected devices and external communications with other devices). In various embodiments, the network 102 may include one or more base station(s), relay(s), router(s), switch(es), routing station (s), and/or the like.

In one embodiment, the EPM system 103 may be configured as a cloud-based system. In a cloud-based system, application programs, file storage and other computing resources are remotely provided over the Internet through a browser. A web browser may be capable of running a program that is embedded in the browser (e.g., applets), which can further be application programming interfaces to more other applications running remotely on servers. In a cloud-based system a user can create, update and delete files on the remote server via the application program running remotely, which is accessed through the browser. In various embodiments, one or more devices of the enterprise may be communicatively coupled to transmit data to and/or receive data from one another over the network. Such configuration (s) include, without limitation, a wired or wireless Personal Area Network (PAN), a Cloud network, Local Area Network (LAN), Metropolitan Area Network (MAN), Wide Area Network (WAN), and/or the like.

In an embodiment, an enterprise 101 may be a business entity, an organization, a data warehouse, or any separate, standalone entities. Each enterprise 101 is linked with one or more user devices 101*a*, 101*b* from which the data originates and is configured to be transmitted over the communication network to EPM framework. The user devices 101*a*, 101*b* may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein.

One or more enterprises 101 are registered with EPM system 103 through a registration process. The registration process includes setting up a user account with EPM. In an embodiment, for devices, which are designated to send the data to the EPM system, a user account may be created with specific login credentials. The user account may identify the user's name, devices associated with the user. In an embodiment, the user account details may also specify the data type or file type which will be uploaded onto the EPM system. EPM registered users can use their identity domain credentials to connect to EPM system.

An exemplary system 100 according to an aspect of the present disclosure comprises one or more enterprises 101 having one or more user devices 101*a*, 101*b* which generate data to be used by EPM system 103. One or more enterprises 101 are connected to the EPM system 103 through a network 102. In one aspect, the EPM system 103 comprises a data identification module 104, a converter module 108. Further, the converter module 108 is operationally coupled to a plugin module 109. In an embodiment, the converter module includes one or more converters and a plugin module 109 having one or more plugins.

In a further embodiment, the EPM system 103 further comprises a plug registration module 105 which is coupled to data identification module 104. Further, the system 100 comprises a database module 106 which is operationally coupled to repository 107. The data identification module 104 and the plugin registration module 105 are operationally coupled to the database module 106. Further, the system 100 comprises a cloud storage 110 for receiving and storing the EPM files. The cloud storage 109 is coupled to the EPM system 103 and the files stored in the cloud storage 109 may be retrieved and the information utilized for performing the data analytics.

One or more user devices associated with one or more enterprises may generate a proprietary data which may need additional plugins for data conversion by converter framework of EPM system. A proprietary file format is a file format of an enterprise or individual that contains data that is stored with particular encoding-scheme and designed by the enterprise to be secret, such that the decoding and interpretation of this stored data is easily accomplished only with particular plugin that the enterprise itself has developed.

In an embodiment, the data identification module 104 receives data from one or more user devices 101*a*, 101*b* that are registered with the EPM system. The data identification module 104 upon receiving the data may identify that the data received is a proprietary data. The identification of data type being a proprietary data may be based on configuration files associated with the user device. In another embodiment, the identification of data type being a proprietary data may be based on information received as part of data. The information indicating the proprietary nature of data may be included in the header block of the received data. The data identification module 104, based on identification that the received data is a proprietary data, may query the database module 106 to determine if a plugin needed for converting the proprietary data to intermediate format is available.

Based on the determination by the database module 106 that the plugin required for conversion of incoming data to intermediate format is not available, the same is indicated to the data identification module 104. The data identification module 104 relays the information received from the database module to the plugin registration module 105 along with additional information on received data such as user device, enterprise and data type.

The plugin registration module 105, in an embodiment, may initiate a request to the user device to query if the user device have necessary plugin for conversion of data to intermediate format and request the user device to register the plugin with the EPM system.

In an alternative embodiment, the user device while sending data to the EPM system, also sends a registration request for registration of a plugin. The registration request may be sent directly to plugin registration module 105. Alternatively, the registration request may be sent to data identification module 104 along with the data and the data identification module 104 may send the registration request to the plugin registration module 105.

In an embodiment, the plugin registration module 105 may receive a registration request from one or more user devices 101*a*, 101*b* which are registered with the EPM system. In an alternative embodiment, the plugin to be registered is received along with the registration request. In another embodiment, the registration module 202 may send acknowledgement to the user device indicating the acceptance of registration request and the user device may subsequently send the plugin to the registration request receiving module 202.

The plugin registration module 105 is operationally coupled to the database module 106 and is configured to query the database module if a plugin needed for converting the proprietary data to intermediate format is available. In an embodiment, the database module 106 may be operatively coupled to the EPM system but may reside outside the EPM system. Further, the plugin registration module 105 is configured to collaborate with the data identification module to retrieve the user device configuration information based on registration request received by the plugin registration module 105.

The data identification module 104 and the plugin registration module 105 is operationally coupled to database module 106 and the repository 107. The database module 106 updates configuration details of enterprises and user devices which are registered with EPM system and is configured to retrieve information from the repository 107. Further, the repository 107 stores the information on the registered enterprises and its associated user/user devices. The repository 107 comprises configuration files which stores information on datatype associated with a particular user device and rules/settings are configured for routing of data from the registered user devices. The data identification module 104 or the plugin registration module 105 is configured to receive configuration files for the identified user device including plugin identifiers, converter identifiers.

In an exemplary embodiment, the data identification module 104 or plugin registration module 105 determines if the plugin for which the registration request is received is already registered. The data identification module 104 and the plugin registration module 105 are operationally coupled to the database module 106. The plugin registration module 105 queries the database module 106 to verify if the plugin for which the registration request has been received is already registered. In a further embodiment, the database module 106 may further query the repository to check the registration status of the plugin.

The database module 106 determines that the plugin for which registration request is received is not available with the repository, the information is indicated to the plugin registration module 105. Based on feedback, the registration module 105 forwards the plugin to the repository for addition and accordingly, the plugin identifiers are added in the database module 106.

In a further embodiment, the data identification module 104 provides additional information to the plugin registration module 105, said information may include user device information, data type, enterprise from which the data originates and rules associated with the user device. The plugin registration module 105 may further send the information to the database module 106, so as to update the association of plugin identifiers and converter identifiers with the user device and corresponding configuration files are updated.

In an alternative embodiment, the database module 106 determines that the plugin for which registration request is received is already registered with the repository and the information is indicated to the plugin registration module 105. Based on feedback, the registration module 105 sends a feedback to the user device indicating the plugin for which the registration request is received is already registered. In a further embodiment, the plugin registration module 105 may query the user device if there is any updated version of the plugin which needs to replace an updated version of the plugin stored in the repository. In a further embodiment, the database module 106 is updated to associate updated plugin to the user device.

In a further embodiment, the plugin registration module 105 provides an access control to the user device 101*a*, 101*b*. The access control of the user device may include deleting, scheduling or updating the plugin. The user device is provided with an access wherein the user may delete the plugin when the user device no longer sends the proprietary data. The user device is also configured to schedule the usage of plugins by the converter framework based on scheduling of data being send to EPM system. In a further configuration, the user is provided with access to update the plugin with an updated version of plugin based on change in data which is being sent to EPM system. In an embodiment, the plugin registration module 105 provides access to user device specific registered plugins.

The exemplary system of the present disclosure enables the user device to dynamically register the plugin with the EPM system where the data generated by the user device is a proprietary data. The registration of plugin at the EPM system for the proprietary data enables the EPM system to effectively convert the propriety data into an intermediate format and the intermediate data format is subsequently converted by one or more converters. This eliminates the burden on the user device's end to convert the data into an intermediate format before the data is uploaded/sent to the EPM system for conversion to EPM files. Moreover, the system of the present disclosure provides the user, an access to edit, delete or update the plugin as necessary based on type of proprietary data being generated by the user device.

FIG. 2 illustrates an exemplary embodiment of the plugin registration module 200 according to the present disclosure. The plugin registration module 200 comprises a registration request receiving module 202 and a plugin access control module 203.

In one embodiment, the plugin registration receiving module 202 is configured to receive the plugin registration request from one or more user devices. In one embodiment, the plugin registration receiving module 202 is configured to receive the registration request via the data identification module 104. The data identification module 104 upon receiving the data, may determine that the data represents a plugin registration request and the request may be forwarded to the registration request module 202 along with user device identification information and associated data type. The data identification module 104 may query the database module 106 to retrieve the configuration files for the identified user device, plugin identifiers, converter identifiers etc. The retrieved information is forward to the plugin registration receiving module 202 for further processing of the registration request. In an alternative embodiment, the plugin registration request is received directly by the plugin registration receiving module 202 from one or more user devices.

In an embodiment, the registration request receiving module 202 is operationally coupled to the repository via a database module. The registration request receiving module 202 upon receiving the registration request, may query the database module 204 to determine if the plugin is already registered with plugin sub module. The database module 204, upon determination that the plugin for which the registration request is raised is not previously registered, communicates with the repository to add the plugin information and the plugin module 205 is updated to add the plugin identifier for added plugin. The database module 204 is configured to query the repository 107 and update one or more submodules of the database module 204 to associate the plugin identifier with the user device and enterprise and its propriety data type. Further, the database module 204 is updated to associate plugin identifier to one or more converters. Further, the registration module 200, upon successful registration of plugin, send an acknowledgement to the user device.

In an alternative embodiment, the plugin to be registered is received along with the registration request. In another embodiment, the registration module 202 may send acknowledgement to the user device indicating the acceptance of registration request and the user device may subsequently send the plugin to the registration request receiving module 202. In an alternative embodiment, the plugin to be registered is not received along with the registration request. The registration module 202 may send query to the user device to send the plugin associated with the registration request. Upon receiving the query, the user device may subsequently send the plugin to the registration request receiving module 202.

In an alternative embodiment, the registration request receiving module 202 is operationally coupled to the repository via a database module. The registration request receiving module 202 upon receiving the registration request, may query the database module 204 if the plugin is already registered with plugin sub module. The database module 204, upon determination that the plugin for which the registration request is raised is already registered, the plugin registration module 200 sends the feedback to the user device intimating the same. Further, in an embodiment, if the registration request receiving module 202 determines, via repository, that the plugin for which registration request is received is already stored in the repository, the database module 204 is updated to add the plugin identifier in the plugin submodule and the configuration files for the user device is updated in the database module 204.

In another aspect, the plugin registration module 200 comprises a plugin access control module 203. The plugin access control module 203 provides one or more access control to the user device 201. In an embodiment, the access control of the user device may include deleting, scheduling or updating the plugin. The user device 201 is provided with an access wherein the user may delete the plugin when the user device no longer sends the proprietary data. The user device 201 is also configured to schedule the usage of plugins by the converter framework based on scheduling of data being send to EPM system. In a further configuration, the user is provided with access to update the plugin with an updated version of plugin based on change in data which is being sent to EPM system.

In an embodiment, the plugin access control module 203 is operationally coupled to repository 206 via the database module 204. Based on access control by the user device and change in configuration of plugins by the user device, the access control module 203 provides further instructions to database module 204 to update one or more configuration settings corresponding to plugins associated with user device.

In a further embodiment, the plugin access control module 203 provides the user devices an access only to specific registered plugins.

FIG. 3 illustrates an exemplary embodiment of the database module 300 of the present disclosure. The database module 300 stores configuration details of enterprises and user devices which are registered with EPM system. The configuration details include the list of enterprises, list of user devices belonging to one or more registered enterprises, the data type in respect of one or more user devices, plugin identifiers for one or more data types, and routing rules and settings for routing the data to converters. In an embodiment, the routing rules may include predefined rules for routing the incoming data from a particular user device to a specific converter along with specific plugin to be used based on data type. Further, the settings configuration may include scheduling of routing, and updating of routing protocols.

The database module 300 includes a memory 301 which stores one or more sub-modules namely, an enterprise sub-module 302, a user device and data type sub-module 303, a rule sub-module 304, a converter sub-module 305 and a plugin sub-module 306.

The memory 301 may be non-transitory and may include, for example, one or more volatile and/or non-volatile memories. In some embodiments, the memory includes or embodies an electronic storage device (e.g., a computer readable storage medium). In some embodiments, the memory is configured to store information, data, content, applications, instructions, or the like, for enabling a system to carry out various operations and/or functions in accordance with example embodiments of the present disclosure.

In an embodiment, the enterprise sub-module 302 identifies one or more enterprises which are registered with the EPM system. One or more information identifying a particular enterprise may include domain name and domain ID of a particular enterprise. Further, the enterprise sub-module 302 also includes a list of user/user devices which belongs to the one or more enterprises. Information associated with user devices may include name of the device, device's IP address, file type generated by the devices, login credentials of user devices etc. In an embodiment, the enterprise sub-module 302 associates the user devices to the enterprise so that the information can be retrieved by the data identification module.

In a further embodiment, the user device and data type sub-module 303 provides the association of one or user device with a data type. The data type of files generated by one or more user devices is established and association is created in the data type sub-module 303. In an exemplary embodiment, one or more non-standard format generated by the user device may include file with extensions for example .doc, .xls, .csv, .ppt, .pdf, and other additional data type such as image file, message stream. Further, the user devices may generate proprietary data which also non-standard format with extensions for example, .rtf, .swf, .xfa, .cdr, .dwg, .psd, .rar, .wma and other similar proprietary data types.

Further, the rule sub-module 304 includes one or more rules to be adopted to process the received data from a user device. One or more rules associated with the user device may include routing protocols, scheduling data conversion, rules associated with processing of single file or multiple files for a specific user device. The rule sub-module 304 may additionally include, for example, plugin information, which may be required to be used for a particular user device, and settings related to enabling and disabling of one or more features related to routing protocols.

In a further embodiment, the converter sub-module 305 associates one or more data type to one or more converters for data conversion. In an exemplary embodiment, a specific data type may be converted by one or more converters. In a further embodiment, one or more user devices may be associated to one or more converters based on their data type.

In another embodiment, the plugins sub-module 306 associates one or more plugin identifiers with one or more data types of user devices. The plugin sub-module 306 provides association of various standard and non-standard/proprietary plugin which are registered with the repository, with the user devices.

The database module 300 stores data indicating linking of various parameters such enterprise, user device, converters, plugins and the data type. The database module 300 is coupled to the repository to fetch the stored information on enterprise data, user device data, plugins and converters. The database module 300 through various sub-modules such as the enterprise sub-module 302, the user device and data type sub-module 303, the rule sub-module 304, the converter sub-module 305 and a plugin sub-module 306, provides the link between the enterprises and their associated user device, the data type associated with each user device, plugin associated with user devices, rule and protocol associated with each user device, and converters associated with different data types.

The database module 300 is accessed by the data identification module to retrieve the information based on association of enterprises, user devices, data type, plugins, converters, and its corresponding rules, which enables the data identification module to process the incoming data from one or more user devices.

In a further embodiment, the database module 300 is updated from time to time based on information stored in the repository, so as to provide the data identification module with updated association between enterprises, user devices, data type, plugins, converters and its corresponding rules.

In an embodiment, the database module 300 can be an integral part of the EPM system 103. In an alternative embodiment, the database module 300 can be remotely located which can be accessed by the EPM system 103 through a network. In yet another alternative embodiment, the database module 300 and repository can be an integral part of the EPM system 103.

FIG. 4 illustrate a method 400 in accordance with the embodiments of the present disclosure. The method begins at step 401, the EPM system receives a plugin registration request from a user device. The user device requesting plugin registration, in exemplary embodiment, generates a proprietary data. The plugin registration request may be received by the data identification module 104 and subsequently the request is forwarded to the plugin registration module 105. In an alternative embodiment, the plugin registration request is received directly by the registration module 105.

In Step 402, the plugin is identified for which the registration request is received from the user device. In embodiment, the data identification module 104 may receive the registration request and send an acknowledgement to the user device indicating the acceptance of its registration request. Subsequently, the user device may send the plugin to be registered with the repository. In an alternative embodiment, the data identification module 104 may receive the registration request and said registration request may include plugin to be updated with the repository.

In step 403, the data identification module based on registration request determine the user device which initiated the registration request and its data type. In an alternative embodiment, when the registration request is received by the registration module (402), the registration module (402) which is operationally coupled to data identification module (204) which in turn is operationally coupled to repository (207) via the database module (206) retrieves the user device information and its data type. In an embodiment, when the data identification module 104 receives the data which is determined to be a plug registration request, the request is forwarded to the registration request module (402) along with user device identification information and associated data type. The data identification module (204) may query the database module (206) to retrieve the configuration files for the identified user device, plugin identifiers, converter identifiers and the retrieved information is forward to the registration module (402) for further processing of the registration request.

In Step 404, the data identification module 104 or plugin registration module 105 determines if the plugin for which the registration request is received is already registered with the repository 107. The data identification module 104 and the plugin registration module 105 are operationally coupled to the database module 106. The plugin registration module 105 queries the database module 106 to verify if the plugin for which the registration request has been received is already registered. In a further embodiment, the database module 106 may further query the repository to check the registration status of the plugin.

In Step 405, the database module 106 determines that the plugin for which registration request is received is not available with the repository, the information is indicated to the plugin registration module 105. Based on feedback, the registration module 105 forwards the plugin to the repository for addition and accordingly, the plugin identifiers are added in the database module 106. In a further embodiment, the data identification module 104 provides additional information to the plugin registration module 105, said information may include user device information, data type, enterprise from which the data originates and rules associated with the user device. The plugin registration module 105 may further send this information to the database module 106, so as to update the association of plugin identifiers and converter identifiers with the user device and corresponding configuration files are updated.

In Step 406, the database module 106 determines that the plugin for which registration request is received is already registered with the repository and the information is indicated to the plugin registration module 105. Based on feedback, the registration module 105 sends a feedback to the user device indicating the plugin for which the registration request is received is already registered. In a further embodiment, the plugin registration module 105 may query the user device if there is any updated version of the plugin which needs to replace an updated version of the plugin stored in the repository. In a further embodiment, the database module 106 is updated to associate updated plugin to the user device.

In Step 407, the plugin access control module 203 provides one or more access control to the user device 101a, 101b. The access control of the user device may include deleting, scheduling or updating the plugin. The user device is provided with an access wherein the user may delete the plugin when the user device no longer sends the proprietary data. The user device is also configured to schedule the usage of plugins by the converter framework based on scheduling of data being send to EPM system. In a further configuration, the user is provided with access to update the plugin with an updated version of plugin based on change in data which is being sent to EPM system. In an embodiment, the plugin access control module 203 provides access to user device specific registered plugins.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment). The present disclosure intends to include specific reference to all combinations and sub combinations of physically compatible features, components, apparatuses, and processes described herein. As used herein, the term "or" is used in both the alternative and conjunctive sense, unless otherwise indicated. Use of any such aforementioned terms, or similarly interchangeable terms, should not be taken to limit the spirit and scope of embodiments of the present disclosure. As used in the specification and the appended claims. The singular form of "a," "an," and "the" include plural references unless otherwise stated. The terms "includes" and/or "including," when used in the specification, specify the presence of stated features, elements, and/or components, and/or groups thereof.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

One or more modules of the EPM system may be implemented using electronic hardware, computer software, or any combination thereof. Whether such elements are implemented as hardware or software depends upon the application and design constraints imposed on the overall system. Examples of the systems may include computing systems (e.g., servers, datacenters, desktop computers, Internet of Things devices, etc.) and mobile computing systems (e.g., laptops, cell phones, etc.). Although components are described with respect to functional limitations, it should be understood that the particular implementations necessarily include the use of particular computing hardware. It should also be understood that in some embodiments certain of the components described herein include similar or common hardware.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments, a storage system or other management entity within the artificial intelligence and machine learning infrastructure may also implement automated training with continuous learning based on new data.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. A system for dynamic registration of plugins in an enterprise performance management system, comprising:
   a processor;
   a memory storing program instructions which, when executed by the processor, causes the processor to:
   receive data from one or more user devices, said data comprising proprietary information associated with the one or more user devices;

receive a plugin registration request from the one or more user devices;
identify the enterprise, user device and datatype of the received data;
identify the plugin for which the registration request is received;
query a database to identify if the plugin for which the registration request is received is a registered plugin or an unregistered plugin;
determine that the plugin is registered with the database and an updated version of the plugin is available,
update the database to add the registered plugin and configuration information of the one or more user devices which requested the registration of the plugin dynamically by replacing the plugin stored in a repository with the updated version of the plugin;
update the database to store routing rules associated with the user device, wherein the routing rules include atleast routing protocols and scheduling of data conversion, and wherein the routing rules specify atleast routing of the received data from the user device to a one or more converters along with the registered plugin based on the datatype of the received data; and
enable the enterprise performance management system to:
convert a proprietary data generated by the user device into an intermediate format utilizing dynamically registered plugins; and
convert the intermediate format into a standard format utilizing the one or more converters.

2. The system of claim 1, wherein the processor is configured to:
receive data from one or more user devices, said data comprising proprietary information associated with the one or more user devices;
query the database if a plugin is available for converting the proprietary information;
determine that the plugin required for converting the proprietary information is not available; and
send a query to the one or more user devices for registration of a plugin with the enterprise performance management system.

3. The system of claim 1, wherein the processor is configured to:
receive a plugin registration request from the one or more user devices;
identify if the plugin is attached with plugin registration request;
determine that the plugin is not attached to the plugin registration request; and
query the one or more user devices to send the plugin required to be added.

4. The system of claim 1, wherein the processor is configured to:
receive information indicating that plugin is not previously registered with the database; and
in response to determining that the plugin is unregistered with the database, request the user device to add the unregistered plugin to the repository.

5. The system of claim 1, wherein the processor is configured to:
receive information from the database indicating that the plugin is already registered with the database;
send feedback to the user device indicating the previous registration of the plugin.

6. The system of claim 1, wherein the processor is configured to:
add the plugin and configuration in the database;
provide an access control to one or more user devices for the added plugin.

7. A method for dynamic registration of plugins in an enterprise management system, comprising:
receiving data from one or more user devices, said data comprising proprietary information associated with the one or more user devices;
receiving a plugin registration request from the one or more user devices;
identifying the enterprise, user device and datatype of the received data;
identifying the plugin for which the registration request is received;
querying a database to identify if the plugin for which the registration request is received is a registered plugin or an unregistered plugin;
determining that the plugin is registered with the database and an updated version of the plugin is available,
updating the database to add the registered plugin and configuration information of the one or more user devices which requested the registration of the plugin dynamically by replacing the plugin stored in a repository with the updated version of the plugin;
updating the database to store routing rules associated with the user device, wherein the routing rules include atleast routing protocols and scheduling of data conversion, and wherein the routing rules specify atleast routing of the received data from the user device to a one or more converters along with the registered plugin based on the datatype of the received data; and
enabling the enterprise performance management system to:
convert a proprietary data generated by the user device into an intermediate format utilizing dynamically registered plugins; and
convert the intermediate format into a standard format utilizing the one or more converters.

8. The method of claim 7, comprising:
receiving data from one or more user devices, said data comprising proprietary information associated with the one or more user devices;
querying the database if a plugin is available for converting the proprietary information;
determining that the plugin required for converting the proprietary information is not available; and
sending a query to the one or more user devices for registration of a plugin with the enterprise performance management system.

9. The method of claim 7, comprising:
receiving a plugin registration request from the one or more user devices;
identifying if the plugin is attached with plugin registration request;
determining that the plugin is not attached to the plugin registration request; and
querying the one or more user devices to send the plugin required to be added.

10. The method of claim 7, comprising:
receiving information indicating that plugin is not previously registered with the database; and
in response to determining that the plugin is unregistered with the database, request the user device to add the unregistered plugin to the repository.

11. The method of claim 7, comprising:
receiving information from the database indicating that the plugin is already registered with the database;

sending feedback to the user device indicating the previous registration of the plugin.

12. The method of claim 7, comprising:
adding the plugin and configuration in the database;
providing an access control to one or more user devices for the added plugin.

13. A non-transitory computer-readable storage medium storing program instructions for processing data received from a plurality of user devices in an enterprise management system, when executed, perform the steps of:
receiving data from one or more user devices, said data comprising proprietary information associated with the one or more user devices;
receiving a plugin registration request from the one or more user devices;
identifying the enterprise, user device and datatype of the received data;
identifying the plugin for which the registration request is received;
querying a database to identify if the plugin for which the registration request is received is a registered plugin or an unregistered plugin;
determining that the plugin is registered with the database and an updated version of the plugin is available,
updating the database to add the registered plugin and configuration information of the one or more user devices which requested the registration of the plugin dynamically by replacing the plugin stored in a repository with the updated version of the plugin;
updating the database to store routing rules associated with the user device, wherein the routing rules include atleast routing protocols and scheduling of data conversion, and wherein the routing rules specify atleast routing of the received data from the user device to a one or more converters along with the registered plugin based on the datatype of the received data; and
enabling the enterprise performance management system to:
convert a proprietary data generated by the user device into an intermediate format utilizing dynamically registered plugins; and
convert the intermediate format into a standard format utilizing the one or more converters.

14. The non-transitory computer-readable storage medium of claim 13, comprising program instructions to perform the steps of:
receive data from one or more user devices, said data comprising proprietary information associated with the one or more user devices;
query the database if a plugin is available for converting the proprietary information;
determine that the plugin required for converting the proprietary information is not available; and
send a query to the one or more user devices for registration of a plugin with the enterprise performance management system.

15. The non-transitory computer-readable storage medium of claim 13, comprising program instructions to perform the steps of:
receive a plugin registration request from the one or more user devices;
identify if the plugin is attached with plugin registration request;
determine that the plugin is not attached to the plugin registration request; and
query the one or more user devices to send the plugin required to be added.

16. The non-transitory computer-readable storage medium of claim 13, comprising program instructions to perform the steps of:
receiving information indicating that plugin is not previously registered with the database; and
in response to determining that the plugin is unregistered with the database, request the user device to add the unregistered plugin to the repository.

17. The non-transitory computer-readable storage medium of claim 13, comprising program instructions to perform the steps of:
receiving information from the database indicating that the plugin is already registered with the database;
sending feedback to the user device indicating the previous registration of the plugin.

18. The non-transitory computer-readable storage medium of claim 13, comprising program instructions to perform the steps of:
adding the plugin and configuration in the database;
providing an access control to one or more user devices for the added plugin, wherein the access control to the user device include access to delete, schedule or update the plugin.

* * * * *